(12) United States Patent
Kataoka et al.

(10) Patent No.: US 10,286,634 B2
(45) Date of Patent: May 14, 2019

(54) DECORATIVE SHEET AND DECORATIVE RESIN-MOLDED ARTICLE

(71) Applicant: Dai Nippon Printing Co., Ltd., Tokyo (JP)

(72) Inventors: Sakie Kataoka, Tokyo (JP); Nobuo Saitou, Tokyo (JP); Megumi Awa, Tokyo (JP); Hideaki Koike, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 15/128,180

(22) PCT Filed: Mar. 24, 2015

(86) PCT No.: PCT/JP2015/058970
§ 371 (c)(1),
(2) Date: Sep. 22, 2016

(87) PCT Pub. No.: WO2015/147006
PCT Pub. Date: Oct. 1, 2015

(65) Prior Publication Data
US 2017/0095996 A1  Apr. 6, 2017

(30) Foreign Application Priority Data

Mar. 24, 2014 (JP) ................. 2014-060827
Mar. 24, 2014 (JP) ................. 2014-060828
(Continued)

(51) Int. Cl.
*B32B 27/06* (2006.01)
*B32B 27/36* (2006.01)
(Continued)

(52) U.S. Cl.
CPC .......... *B32B 27/06* (2013.01); *B29C 35/0866* (2013.01); *B29C 45/14811* (2013.01);
(Continued)

(58) Field of Classification Search
CPC .......... B32B 2307/714; B32B 2451/00; B32B 27/06; B32B 27/26; B32B 27/365;
(Continued)

(56) References Cited

U.S. PATENT DOCUMENTS 5,132,148 A * 7/1992 Reafler ............... B01F 17/0057
427/393.5
5,955,512 A * 9/1999 Numazawa ............ C09J 175/16
428/343
(Continued)

FOREIGN PATENT DOCUMENTS

JP  03-157414 A  7/1991
JP  2000-102949 A  4/2000
(Continued)

OTHER PUBLICATIONS

International Search Report dated Jun. 30, 2015, issued for PCT/JP2015/058970.

*Primary Examiner* — Thao T Tran
(74) *Attorney, Agent, or Firm* — Locke Lord LLP; James E. Armstrong, IV; Nicholas J. DiCeglie, Jr.

(57) ABSTRACT

The present invention provides a decorative sheet that excels in moldability and a decorative resin-molded article that uses the decorative sheet and that excels in chemical resistance. In the decorative sheet, at least a substrate layer and a surface protection layer formed of an ionizing radiation curable resin composition are stacked. The surface protection layer includes blocked isocyanate.

17 Claims, 1 Drawing Sheet

(30) Foreign Application Priority Data

Sep. 26, 2014 (JP) .................................. 2014-196998
Sep. 26, 2014 (JP) .................................. 2014-196999

(51) Int. Cl.

| | |
|---|---|
| *B32B 27/40* | (2006.01) |
| *C08G 18/62* | (2006.01) |
| *C08G 18/80* | (2006.01) |
| *B29C 51/12* | (2006.01) |
| *B29C 35/08* | (2006.01) |
| *B29C 45/14* | (2006.01) |
| *B32B 27/26* | (2006.01) |
| *B29C 51/16* | (2006.01) |
| *C08G 18/73* | (2006.01) |
| *C08F 299/02* | (2006.01) |
| *C09D 175/04* | (2006.01) |
| *C08L 75/04* | (2006.01) |
| *C08G 18/79* | (2006.01) |
| *B29K 633/04* | (2006.01) |
| *B29K 669/00* | (2006.01) |
| *B29K 675/00* | (2006.01) |
| *B29L 31/00* | (2006.01) |

(52) U.S. Cl.
CPC .............. *B29C 51/12* (2013.01); *B29C 51/16* (2013.01); *B32B 27/26* (2013.01); *B32B 27/365* (2013.01); *B32B 27/40* (2013.01); *C08F 299/02* (2013.01); *C08G 18/6225* (2013.01); *C08G 18/73* (2013.01); *C08G 18/792* (2013.01); *C08G 18/8061* (2013.01); *C08L 75/04* (2013.01); *C09D 175/04* (2013.01); *B29C 2035/0877* (2013.01); *B29K 2633/12* (2013.01); *B29K 2669/00* (2013.01); *B29K 2675/00* (2013.01); *B29K 2995/007* (2013.01); *B29L 2031/722* (2013.01); *B32B 2307/714* (2013.01); *B32B 2451/00* (2013.01)

(58) Field of Classification Search
CPC .... B32B 27/40; C08G 18/6225; C08G 18/73; C08G 18/792; C08G 18/8061; C08F 299/02; C08L 75/04; C09D 175/04; B29C 2035/0877; B29C 35/0866; B29C 45/14811; B29C 51/12; B29C 51/16; B29K 2633/12; B29K 2669/00; B29K 2675/00; B29K 2995/007; B29L 2031/722
USPC ....................................................... 428/423.3
See application file for complete search history.

(56) References Cited

U.S. PATENT DOCUMENTS

| | | | |
|---|---|---|---|
| 2012/0121920 A1* | 5/2012 | Kuhlmann | B05D 7/04 428/521 |
| 2013/0209819 A1 | 8/2013 | Noda et al. | |
| 2013/0309460 A1* | 11/2013 | Saitou | B05D 7/24 428/195.1 |
| 2015/0239159 A1* | 8/2015 | Leonhardt | B29C 45/1418 428/141 |

FOREIGN PATENT DOCUMENTS

| | | |
|---|---|---|
| JP | 2007-062254 A | 3/2007 |
| JP | 2009-184284 A | 8/2009 |
| JP | 2012-091498 A | 5/2012 |
| JP | 2013-082216 A | 5/2013 |
| JP | 2013-082217 A | 5/2013 |

\* cited by examiner

DECORATIVE SHEET AND DECORATIVE RESIN-MOLDED ARTICLE

TECHNICAL FIELD

The present invention relates to a decorative sheet excellent in moldability. Further, the present invention relates to a decorative resin molded article which is obtained using the decorative sheet and which is excellent in chemical resistance.

BACKGROUND ART

Decorative resin molded articles with a decorative sheet laminated on the surface of a resin molded article have been used heretofore in vehicle interior and exterior components, building interior materials, housings for home electric appliances, and the like. In production of such a decorative resin molded article, for example, a molding method is used in which a decorative sheet given a design beforehand is integrated with a resin by injection molding. Typical examples of the molding method include an insert molding method in which a decorative sheet is molded into a three-dimensional shape beforehand by a vacuum molding die, the decorative sheet is inserted into an injection molding die, and a fluidized resin is injected into the die to integrate the resin with the decorative sheet, and an injection molding simultaneous decorating method in which a decorative sheet inserted into a die in injection molding is integrated with a molten resin injected into a cavity.

Decorative sheets to be used for production of decorative resin molded articles are required to have not only moldability but also a function of giving decorative resin molded articles contamination resistance with respect to various products that are used in the everyday life. Particularly, in recent years, skin care products such as sunscreen cosmetics, insect repellents and so on have tended to be often used, and thus the skin coated with such a skin care product has come into contact with decorative resin molded articles more frequently before. Accordingly, decorative sheets are strongly desired to have chemical resistance with respect to skin care products and so on.

Several techniques for imparting moldability and chemical resistance to a decorative sheet have been heretofore proposed. For example, Patent Document 1 discloses that when in a decorative sheet including a mold release layer and a surface protective layer in this order on one surface of a base material sheet, the surface protective layer is formed of an ionizing radiation curable resin composition which contains a polyfunctional (meth)acrylate monomer having a molecular weight of 175 to 1000 and a thermoplastic resin having a weight average molecular weight of 10000 to less than 100000, and the mass ratio of the polyfunctional (meth)acrylate monomer and the thermoplastic resin in the resin composition is 10:90 to 75:25, the decorative sheet has contamination resistance with respect to sunscreen creams, and moldability.

The technique described in Patent Document 1 is useful in production of a decorative sheet having excellent moldability and chemical resistance, but these days, consumers' demands for decorative resin molded articles are advanced and diversified, and for following these demands, creation of a new technique for imparting excellent moldability and chemical resistance to a decorative sheet is required.

PRIOR ART DOCUMENT

Patent Document

Patent Document 1: Japanese Patent Laid-Open Publication No. 2012-91498

SUMMARY OF THE INVENTION

Problems to be Solved by the Invention

A main object of the present invention is to provide a decorative sheet excellent in moldability, and a decorative resin molded article which is obtained using the decorative sheet and which is excellent in chemical resistance.

Means for Solving the Problem

In order to achieve the above-mentioned object, the present inventors have extensively conducted studies. Resultantly, the present inventors have found that a decorative sheet including at least a base material layer, and a surface protective layer formed of an ionizing radiation curable resin composition, the surface protective layer containing a blocked isocyanate, is excellent in moldability, and capable of imparting excellent chemical resistance to a decorative resin molded article. The present invention is an invention that has been completed by further conducting studies based on the above-mentioned findings.

That is, the present invention provides inventions of aspects as listed below.

Item 1. A decorative sheet including at least a base material layer, and a surface protective layer formed of an ionizing radiation curable resin composition,
the surface protective layer containing a blocked isocyanate.

Item 2. The decorative sheet according to item 1, wherein the surface protective layer further contains a catalyst that accelerates dissociation reaction of the blocked isocyanate.

Item 3. The decorative sheet according to item 1 or 2, wherein the ionizing radiation curable resin composition contains a polycarbonate (meth)acrylate.

Item 4. The decorative sheet according to item 3, wherein the weight average molecular weight of the polycarbonate (meth)acrylate is 5000 or more.

Item 5. The decorative sheet according to item 3 or 4, wherein the ionizing radiation curable resin composition in the surface protective layer further contains a urethane (meth)acrylate.

Item 6. The decorative sheet according to item 5, wherein a mass ratio of the polycarbonate (meth)acrylate and the urethane (meth)acrylate is in a range of 50:50 to 99:1.

Item 7. The decorative sheet according to any one of items 1 to 6, wherein the thickness of the surface protective layer is 1 to 30 μm.

Item 8. The decorative sheet according to any one of items 1 to 7, further including a primer layer between the base material layer and the surface protective layer.

Item 9. The decorative sheet according to item 8, wherein the primer layer is formed of a resin composition containing a polyol resin.

Item 10. The decorative sheet according to item 9, wherein the polyol resin is at least one selected from the group consisting of an acryl polyol, a polyester polyol and a polycarbonate diol.

Item 11. The decorative sheet according to item 9 or 10, wherein the polyol resin has a glass transition point (Tg) of 55° C. or higher and a weight average molecular weight of 2000 or more.

Item 12. The decorative sheet according to any one of items 1 to 11, further including a pattern layer between the base material layer and the surface protective layer.

Item 13. The decorative sheet according to any one of items 8 to 11, further including a pattern layer between the base material layer and the primer layer.

Item 14. A decorative resin molded article including at least a molded resin layer, a base material layer and a surface protective layer, the surface protective layer being formed of a cured product of an ionizing radiation curable resin composition containing a blocked isocyanate.

Item 15. The decorative resin molded article according to item 14, further including a primer layer between the base material layer and the surface protective layer.

Item 16. A method for producing a decorative resin molded article, the method including: an integration step of inserting the decorative sheet according to any one of items 1 to 13 into an injection molding die, closing the injection molding die, and injecting a fluidized resin into the injection molding die to integrate the resin with the decorative sheet.

Item 17. The method for producing a decorative resin molded article according to item 16, including, before the integration step, a vacuum molding step of molding the decorative sheet into a three-dimensional shape beforehand using a vacuum molding die.

Item 18. The method for producing a decorative resin molded article according to item 17, including a step of heating the decorative sheet in the vacuum molding step.

Advantages of the Invention

According to the present invention, there can be provided a decorative sheet which is excellent in moldability, and capable of imparting excellent chemical resistance to a decorative resin molded article, and a decorative resin molded article obtained using the decorative sheet.

EMBODIMENTS OF THE INVENTION

1. Decorative Sheet

Figure 1:
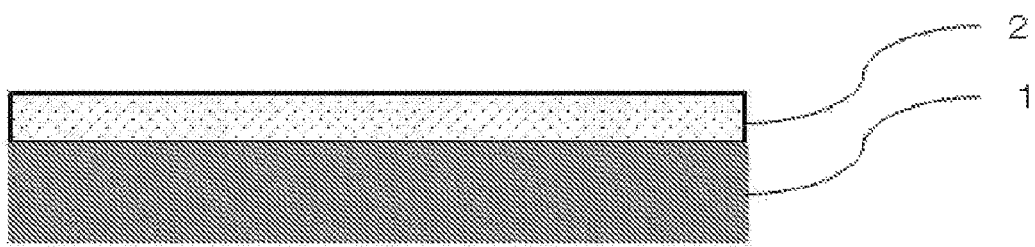
FIG. 1 is a schematic sectional view of one example of a decorative sheet of the present invention.

A decorative sheet of the present invention includes at least a base material layer, and a surface protective layer formed of an ionizing radiation curable resin composition, the surface protective layer containing a blocked isocyanate. In the decorative sheet of the present invention, the surface protective layer formed of an ionizing radiation curable resin composition contains a blocked isocyanate, and thus the decorative sheet has high moldability, and also a function of imparting high chemical resistance to a decorative resin molded article. A detailed mechanism in which high chemical resistance can be imparted to a decorative resin molded article by the decorative sheet of the present invention is not necessarily clear, but may be considered as follows. Since the surface protective layer formed of an ionizing radiation curable resin composition contains a blocked isocyanate, crosslinking by the blocked isocyanate is started in the process of forming a decorative resin molded article, and thus the crosslinking density of the surface protective layer can be increased to harden the surface protective layer, so that a decorative resin molded article obtained using the decorative sheet of the present invention exhibits excellent chemical resistance. Further, before the decorative sheet of the present invention is subjected to molding of a decorative resin molded article, the reaction by the blocked isocyanate is not started, and thus the crosslinking density of the surface protective layer can be kept low, so that the decorative sheet of the present invention during molding retains moderate flexibility, and also has excellent moldability. Hereinafter, the decorative sheet of the present invention will be described in detail.

Laminated Structure of Decorative Sheet

The decorative sheet of the present invention has a laminated structure in which at least a base material layer 1 and a surface protective layer 2 are laminated in this order. In the decorative sheet of the present invention, a pattern layer 3 may be provided as necessary for the purpose of, for example, imparting decorativeness to a resin molded article. For the purpose of, for example, suppressing a change or variation in color of the base material layer 1, a masking layer 5 may be provided as necessary between the base material layer 1 and the surface protective layer 2, or between the base material layer 1 and the pattern layer 3 if the pattern layer 3 is provided. Further, for the purpose of, for example, improving the moldability of the decorative sheet and the adhesion of the layers, a primer layer 4 etc. may be provided as necessary between the base material layer 1 and the surface protective layer 2, or between the pattern layer 3 and the surface protective layer 2 if the pattern layer 3 is provided. Further, an adhesive layer 6 etc. may be provided under the base material layer 1.

Figure 2:
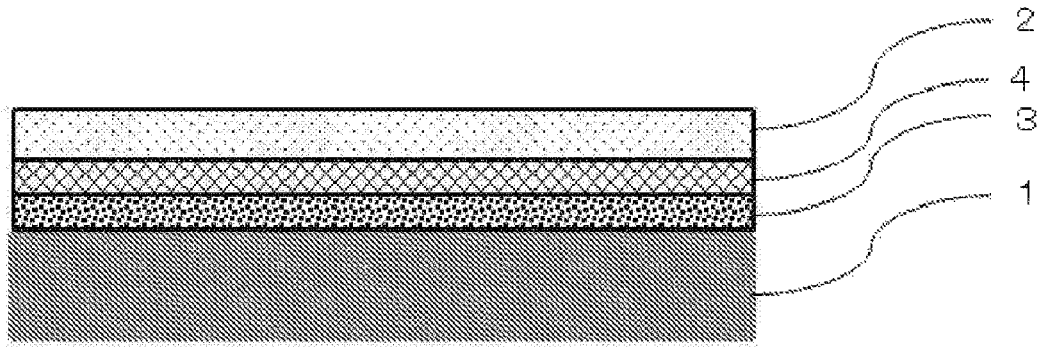
FIG. 2 is a schematic sectional view of one example of the decorative sheet of the present invention.

Examples of the laminated structure of the decorative sheet of the present invention include a laminated structure in which a base material layer and a surface protective layer are laminated in this order; a laminated structure in which a base material layer, a pattern layer and a surface protective layer are laminated in this order; a laminated structure in which an adhesive layer, a base material layer, a pattern layer and a surface protective layer are laminated in this order; a laminated structure in which a base material layer, a masking layer, a pattern layer and a surface protective layer are laminated in this order; a laminated structure in which a base material layer, a primer layer and a surface protective layer are laminated in this order; a laminated structure in which a base material layer, a pattern layer, a primer layer and a surface protective layer are laminated in this order; and a laminated structure in which an adhesive layer, a base material layer, a pattern layer, a primer layer and a surface protective layer are laminated in this order. As one aspect of the laminated structure of the decorative sheet of the present invention, FIG. 1 shows a schematic sectional view of one example of a decorative sheet in which a base material layer and a surface protective layer are laminated in this order. As one aspect of the laminated structure of the decorative sheet of the present invention, FIG. 2 shows a schematic sectional view of one example of a decorative sheet in which a base material layer, a pattern layer, a primer layer and a surface protective layer are laminated in this order.

Compositions of Layers Forming Decorative Sheet

[Base Material Layer 1]

The base material layer 1 is formed of a resin sheet (resin film) that serves as a support in the decorative sheet of the present invention. The resin component to be used in the base material layer 1 is not particularly limited, and may be appropriately selected according to three-dimensional moldability and compatibility with a molded resin layer, but a thermoplastic resin is preferable. Specific examples of the thermoplastic resin include acrylonitrile-butadiene-styrene resins (hereinafter, sometimes referred to as "ABS resins"); acrylonitrile-styrene-acrylic acid ester resins; acrylic resins; polyolefin-based resins such as polypropylene and polyethylene; polycarbonate resins; vinyl chloride-based resins; and polyethylene terephthalate (PET) resins. Among them, ABS resins are preferable from the viewpoint of three-dimensional moldability. The resin components that form the base material layer 1 may be used alone, or may be used in combination of two or more thereof. The base material layer 1 may be formed of a single-layer sheet of the above-mentioned resin, or may be formed of a multi-layer sheet of the same resin or different resins.

One or both of the surfaces of the base material layer 1 may be subjected to a physical or chemical surface treatment such as an oxidation method or a roughening method as necessary for improving adhesion with an adjacent layer. Examples of the oxidation method that is carried out as a surface treatment of the base material layer 1 include corona discharge treatment, plasma treatment, chromium oxidation treatment, flame treatment, hot air treatment and ozone and ultraviolet ray treatment methods. Examples of the roughening method that is carried out as a surface treatment of the base material layer 1 include sand blasting methods and solvent treatment methods. The surface treatment is appropriately selected according to a type of resin component that forms the base material layer 1, but a corona discharge treatment method is preferable from the viewpoint of an effect, handling characteristics and so on.

The base material layer 1 may be colored by blending a colorant etc., coated for arranging the color, or provided with a pattern for giving design characteristics.

The thickness of the base material layer 1 is not particularly limited, and is appropriately set according to a use purpose of the decorative sheet, etc., but it is normally about 50 to 800 µm, preferably about 100 to 600 µm, further preferably about 200 to 500 µm. When the thickness of the base material layer 1 falls within the above-mentioned range, further excellent three-dimensional moldability, design property and so on can be imparted to the decorative sheet.

[Surface Protective Layer 2]

The surface protective layer 2 is a layer that is provided for improving the chemical resistance and scratch resistance of the decorative sheet. The surface protective layer 2 is formed of an ionizing radiation curable resin composition. Further, the surface protective layer 2 contains a blocked isocyanate. As described above, it is considered that in the decorative sheet of the present invention, since the surface protective layer 2 contains a blocked isocyanate, crosslinking by the blocked isocyanate is started in the process of forming a decorative resin molded article, and thus the crosslinking density of the surface protective layer 2 formed of an ionizing radiation curable resin composition can be increased to harden the surface protective layer 2, so that excellent chemical resistance is imparted to the resulting decorative resin molded article. Further, before the decorative sheet of the present invention is subjected to molding of a decorative resin molded article, the reaction by the blocked isocyanate is not started, and thus the crosslinking density of the surface protective layer can be kept low, so that the decorative sheet retains moderate flexibility, and also has excellent moldability.

(Ionizing Radiation Curable Resin)

The ionizing radiation curable resin to be used for formation of the surface protective layer 2 is a resin that is crosslinked and cured when irradiated with an ionizing radiation, and specific examples thereof include those in which prepolymers, oligomers and/or monomers having a polymerizable unsaturated bond or an epoxy group in the molecule are appropriately mixed. Here, the ionizing radiation means an electromagnetic wave or charged particle ray having an energy quantum capable of polymerizing or crosslinking a molecule, and normally an ultraviolet (UV) ray or an electron beam (EB) is used, but the ionizing radiations also include electromagnetic waves such as an X-ray and a γ-ray, and charged particle rays such as an α-ray and an ion beam. Among ionizing radiation curable resins, electron beam curable resins are suitably used in formation of the surface protective layer 2 because they can be made solventless, do not require an initiator for photopolymerization, and exhibit stable curing characteristics.

As the monomer to be used as an ionizing radiation curable resin, (meth)acrylate monomers having a radical-polymerizable unsaturated group in the molecule are suitable, and among them, polyfunctional (meth)acrylate monomers are preferable. The polyfunctional (meth)acrylate monomer may be a (meth)acrylate monomer having two or more polymerizable unsaturated bonds in the molecule (di- or more functional), preferably three or more polymerizable unsaturated bonds in the molecule (tri- or more functional). Specific examples of the polyfunctional (meth)acrylate include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl)isocyanurate, propionic acid-modified dipentaerythritol penta (meth)acrylate, dipentaerythritol hexa(meth)acrylate, ethylene oxide-modified dipentaerythritol hexa(meth)acrylate and caprolactone-modified dipentaerythritol hexa(meth)acrylate. These monomers may be used alone, or may be used in combination of two or more thereof.

As the oligomer to be used as an ionizing radiation curable resin, (meth)acrylate oligomers having a radical-polymerizable unsaturated group in the molecule are suitable, and among them, polyfunctional (meth)acrylate oligomers having two or more polymerizable unsaturated bonds in the molecule (di-or-more functional) are preferable. Examples of the polyfunctional (meth)acrylate oligomer include polycarbonate (meth)acrylate, acrylic silicone (meth)acrylate, urethane (meth)acrylate, epoxy (meth)acrylate, polyester (meth)acrylate, polyether (meth)acrylate, polybutadiene (meth)acrylate, silicone (meth)acrylate, and oligomers having a cation-polymerizable functional group in the molecule (e.g. novolac-type epoxy resins, bisphenol-type epoxy resins, aliphatic vinyl ethers, aromatic vinyl ethers and so on). Here, the polycarbonate (meth)acrylate is not particularly limited as long as it has a carbonate bond on the polymer main chain, and has a (meth)acrylate group at the end or side chain, and the polycarbonate (meth)acrylate can be obtained by esterifying a polycarbonate polyol with (meth)acrylic acid. The polycarbonate (meth)acrylate may be, for example, urethane (meth)acrylate having a polycarbonate backbone. The urethane (meth)acrylate having a polycarbonate backbone is obtained by, for example, reacting a polycarbonate polyol, a polyvalent isocyanate compound and hydroxy (meth)acrylate. The acrylic silicone (meth)acrylate can be obtained by radical-copolymerizing a silicone macro-monomer with a (meth)acrylate monomer. The urethane (meth)acrylate can be obtained by, for example, esterifying a polyurethane oligomer with (meth)acrylic acid, the polyurethane oligomer being obtained by reaction of a polyether polyol or a polyester polyol with a polyisocyanate. The epoxy (meth)acrylate can be obtained by, for example, reacting (meth)acrylic acid with an oxirane ring of a relatively low-molecular-weight bisphenol-type epoxy resin or novolac-type epoxy resin to perform esterification. Carboxyl-modified epoxy (meth)acrylate obtained by partially modifying the epoxy (meth)acrylate with a dibasic carboxylic anhydride can also be used. For example, the polyester (meth)acrylate can be obtained by esterifying hydroxyl groups of a polyester oligomer with (meth)acrylic acid, the polyester oligomer being obtained by condensation of a polyvalent carboxylic acid and a polyhydric alcohol and having a hydroxyl group at each of both ends, or by esterifying a hydroxyl group at the end of an oligomer with (meth)acrylic acid, the oligomer being obtained by adding an alkylene oxide to a polyvalent carboxylic acid. The polyether (meth)acrylate can be obtained by esterifying a hydroxyl group of a polyether polyol with (meth)acrylic acid. The polybutadiene (meth)acrylate can be obtained by adding (meth)acrylic acid to the side chain of a polybutadiene oligomer. The silicone (meth)acrylate can be obtained by adding (meth)acrylic acid to the end or side chain of a silicone having a polysiloxane bond on the main chain. These oligomers may be used alone, or may be used in combination of two or more thereof. In this specification, the "(meth)acrylate" means an "acrylate" or a "methacrylate", and the same applies to other similar terms.

These ionizing radiation curable resins may be used alone, or may be used in combination of two or more thereof.

Among these ionizing radiation curable resins, polycarbonate (meth)acrylate is preferably used for further improving moldability. It is further preferable to use a urethane (meth)acrylate in addition to the polycarbonate (meth)acrylate for improving scratch resistance, chemical resistance and other surface properties.

Hereinafter, polycarbonate (meth)acrylates and urethane (meth)acrylates that are each suitably used as an ionizing radiation curable resin in formation of the surface protective layer 2 will be described in detail.

<Polycarbonate (Meth)Acrylate>

The polycarbonate (meth)acrylate is not particularly limited as long as it has a carbonate bond in the polymer main chain, and has (meth)acrylate at the end or side chain, and it may be, for example, a urethane (meth)acrylate having a polycarbonate backbone. In the (meth)acrylate, the number of functional groups per one molecule is preferably 2 to 6 for improvement of crosslinking and curing. The polycarbonate (meth)acrylate is preferably a polyfunctional polycarbonate (meth)acrylate having two or more (meth)acrylates at the end or on the side chain. The polycarbonate (meth)acrylates may be used alone, or may be used in combination of two or more thereof.

The polycarbonate (meth)acrylate is obtained by, for example, converting some or all of hydroxyl groups of a polycarbonate polyol into a (meth)acrylate (acrylic acid ester or methacrylic acid ester). The esterification reaction can be carried out by a usual esterification reaction. Examples thereof include 1) a method in which a polycarbonate polyol and an acrylic acid halide or methacrylic acid halide are condensed in the presence of a base; 2) a method in which a polycarbonate polyol and an acrylic anhydride or methacrylic anhydride are condensed in the presence of a catalyst; and 3) a method in which a polycarbonate polyol and an acrylic acid or methacrylic acid are condensed in the presence of an acid catalyst. The urethane (meth)acrylate having a polycarbonate backbone is obtained by, for example, reacting a polycarbonate polyol, a polyvalent isocyanate compound and hydroxy (meth)acrylate.

The polycarbonate polyol is a polymer having a carbonate bond in the polymer main chain, and having 2 or more, preferably 2 to 50, further preferably 3 to 50 hydroxyl groups at the end or side chain. A typical method for producing the polycarbonate polyol is a method using a polycondensation reaction of a diol compound (A), a polyhydric alcohol (B) of tri- or more valence, and a compound (C) as a carbonyl component.

The diol compound (A) which is used as a raw material of the polycarbonate polyol is represented by the general formula HO—$R^1$—OH. Here, $R^1$ is a divalent hydrocarbon group with a carbon number of 2 to 20, and may include an ether bond in the group. $R^1$ is, for example, a linear or branched alkylene group, a cyclohexylene group or a phenylene group.

Specific examples of the diol compound include ethylene glycol, 1,2-propylene glycol, diethylene glycol, dipropylene glycol, triethylene glycol, polyethylene glycol, neopentyl glycol, 1,3-propanediol, 1,4-butanediol, 1,5-pentanediol, 3-methyl-1,5-pentanediol, 1,6-hexanediol, 1,8-octanediol, 1,3-bis(2-hydroxyethoxy)benzene, 1,4-bis(2-hydroxyethoxy)benzene, neopentyl glycol, 1,4-cyclohexanediol and 1,4-cyclohexanedimethanol. These diols may be used alone, or may be used in combination of two or more thereof.

Examples of the polyhydric alcohol (B) of tri- or more valence which is used as a raw material of the polycarbonate polyol include alcohols such as trimethylolpropane, trimethylolethane, pentaerythritol, ditrimethylolpropane, dipentaerythritol, glycerin and sorbitol. The polyhydric alcohol of tri- or more valence may be an alcohol having a hydroxyl group with 1 to 5 equivalents of ethylene oxide, propylene oxide or another alkylene oxide added to the hydroxyl group of the polyhydric alcohol. These polyhydric alcohols may be used alone, or may be used in combination of two or more thereof.

The compound (C) as a carbonyl component which is used as a raw material of the polycarbonate polyol is any compound selected from a carbonic acid diester, phosgene and an equivalent thereof. Specific examples of the compound include carbonic acid diesters such as dimethyl carbonate, diethyl carbonate, diisopropyl carbonate, diphenyl carbonate, ethylene carbonate and propylene carbonate; phosgene; halogenated formic acid esters such as methyl chloroformate, ethyl chloroformate and phenyl chloroformate. These compounds may be used alone, or may be used in combination of two or more thereof.

The polycarbonate polyol is synthesized by subjecting a diol compound (A), a polyhydric alcohol (B) of tri- or more valence, and a compound (C) as a carbonyl component to a polycondensation reaction under general conditions. The charged molar ratio of the diol compound (A) and the polyhydric alcohol (B) may be set to, for example, 50:50 to 99:1. The charged molar ratio of the compound (C) as a carbonyl component to the diol compound (A) and the polyhydric alcohol (B) may be set to, for example, 0.2 to 2 equivalents with respect to hydroxyl groups of the diol compound and the polyhydric alcohol.

The equivalent number (eq./mol) of hydroxyl groups existing in the polycarbonate polyol after the polycondensation reaction with the above-mentioned charged ratio is, for example, 3 or more, preferably 3 to 50, further preferably 3 to 20 on average in one molecule. When such an equivalent number is satisfied, a necessary amount of (meth) acrylate groups are formed through an esterification reaction as described later, and moderate flexibility is imparted to the polycarbonate (meth)acrylate resin. The terminal functional groups of the polycarbonate polyol are usually OH groups, but some of them may be carbonate groups.

The method for producing a polycarbonate polyol as described above is described in, for example, Japanese Patent Laid-Open Publication No. S64-1726. The polycarbonate polyol can also be produced through an ester exchange reaction of a polycarbonate diol and a polyhydric alcohol of tri- or more valence as described in Japanese Patent Laid-Open Publication No. H03-181517.

The molecular weight of the polycarbonate (meth)acrylate is not particularly limited, but it is, for example, 5000 or more, preferably 10000 or more in terms of a weight average molecular weight. The upper limit of the weight average molecular weight of the polycarbonate (meth)acrylate is not particularly limited, but it is, for example, 100000 or less, preferably 50000 or less for controlling the viscosity so as not to be excessively high. The weight average molecular weight of the polycarbonate (meth)acrylate is preferably 10000 to 50000, further preferably 10000 to 20000 for further improving the effect of presenting a textural generous low-glossy feeling, and moldability.

The weight average molecular weight of the polycarbonate (meth)acrylate in this specification is a value obtained by performing measurement using a gel permeation chromatography method (GPC) using polystyrene as a standard substance.

In the case where a polycarbonate (meth)acrylate is used, the content of the polycarbonate (meth)acrylate in the ionizing radiation curable resin composition to be used for formation of the surface protective layer 2 is not particularly limited as long as the effect of the present invention is exhibited, but the content of the polycarbonate (meth)acrylate is preferably 50% by mass or more, more preferably 80% by mass or more, further preferably 85% by mass or more for further improving the moldability of the decorative sheet.

<Urethane (Meth)Acrylate>

The urethane (meth)acrylate is not particularly limited as long as it has a urethane bond on the polymer main chain, and a (meth)acrylate at the end or on the side chain. Such urethane (meth)acrylate can be obtained by, for example, esterifying a polyurethane oligomer with (meth)acrylic acid, the polyurethane oligomer being obtained by reaction of a polyether polyol or a polyester polyol with a polyisocyanate. In the urethane (meth)acrylate, the number of functional groups per one molecule is preferably 2 to 12 for improvement of crosslinking and curing. The urethane (meth)acrylate is preferably a polyfunctional urethane (meth)acrylate having two or more (meth)acrylates at the end or on the side chain. The ionizing radiation curable resin composition to be used for formation of the surface protective layer 2 may further contain a urethane (meth)acrylate in addition to the polycarbonate (meth)acrylate. The urethane (meth)acrylates may be used alone, or may be used in combination of two or more thereof.

The molecular weight of the urethane (meth)acrylate is not particularly limited, but it is, for example, 100 or more, preferably 500 or more in terms of a weight average molecular weight. The upper limit of the weight average molecular weight of the urethane (meth)acrylate is not particularly limited, but it is, for example, 100000 or less, preferably 50000 or less for controlling the viscosity so as not to be excessively high.

The weight average molecular weight of the urethane (meth)acrylate in this specification is a value obtained by performing measurement using a gel permeation chromatography method (GPC) using polystyrene as a standard substance.

When the polycarbonate (meth)acrylate and the urethane (meth)acrylate are used in combination in the ionizing radiation curable resin composition to be used for formation of the surface protective layer 2, the mass ratio thereof (polycarbonate (meth)acrylate:urethane (meth)acrylate) is preferably about 50:50 to 99:1, more preferably about 80:20 to 99:1, further preferably about 85:15 to 99:1.

The surface protective layer 2 further contains a blocked isocyanate in addition to the ionizing radiation curable resin. The blocked isocyanate is an isocyanate compound with its isocyanate groups protected by a blocking agent, and the blocked isocyanate is stable at normal temperature, but when it is heated, the blocking agent is dissociated to regenerate active isocyanate groups. Since the blocked isocyanate acts as a crosslinker, the isocyanate compound has two or more isocyanate groups per molecule. The blocked isocyanates may be used alone, or may be used in combination of two or more thereof.

Specific examples of the isocyanate compound include aliphatic diisocyanates such as hexamethylene diisocyanate (HMDI) and trimethylhexamethylene diisocyanate (TMDI); cycloaliphatic diisocyanates such as isophorone diisocyanate (IPDI); aromatic-aliphatic diisocyanates such as xylylene diisocyanate (XDI); aromatic diisocyanates such as tolylene diisocyanate (TDI) and 4,4-diphenylmethane diisocyanate (MDI); hydrogenated diisocyanate such as dimer acid diisocyanate (DDI), hydrogenated TDI (HTDI), hydrogenated XDI (H6XDI) and hydrogenated MDI (H12MDI); dimers and trimers of these diisocyanate compound, and polyisocyanates having a higher molecular weight; and adducts with a polyhydric alcohol such as trimethylolpropane, water, or a low-molecular-weight polyester resin.

Specific examples of the blocking agent include oximes such as methyl ethyl ketoxime, acetoxime, cyclohexanone oxime, acetophenone oxime and benzophenone oxime; phenols such as m-cresol and xylenol; alcohols such as methanol, ethanol, butanol, 2-ethylhexanol, cyclohexanol and ethylene glycol monoethyl ether; lactams such as ε-caprolactam; diketones such as diethyl malonate and acetoacetic acid esters; and mercaptans such as thiophenol. In addition, mention is made of ureas such as thiourea; imidazoles; and carbamic acids.

The blocked isocyanate can be obtained by reacting the isocyanate compound with a blocking agent using a usual method until free isocyanate groups no longer exist. As the blocked isocyanate, a commercially available product can also be used.

For further improving the chemical resistance of the decorative sheet of the present invention, the content of the blocked isocyanate in the surface protective layer 2 is preferably 0.5 parts by mass or more, more preferably 1 part by mass or more, further preferably 3 parts by mass or more based on 100 parts by mass of the ionizing radiation curable resin. On the other hand, when the content of the blocked isocyanate in the surface protective layer 2 is excessively high, the moldability of the decorative sheet is deteriorated, and therefore the content of the blocked isocyanate in the surface protective layer 2 is preferably 100 parts by mass or less, more preferably 50 parts by mass or less based on 100 parts by mass of the ionizing radiation curable resin.

Preferably, the surface protective layer 2 contains, in addition to the blocked isocyanate, a catalyst for accelerating the dissociation reaction of the blocked isocyanate. When the surface protective layer 2 contains such a catalyst, a curing reaction by crosslinking can be caused to sufficiently proceed in a very wide range of heating temperatures and heating durations in formation of a decorative resin molded article using the decorative sheet of the present invention. Accordingly, in common molding conditions, extremely high chemical resistance can be imparted to the decorative resin molded article. The catalysts may be used alone, or may be used in combination of two or more thereof.

Specific examples of the catalyst include organic tin compounds such as dibutyltin dilaurate, dibutyltin dioctoate and dibutyltin acetate; and metal chelate compounds such as aluminum tris(acetylacetonate), titanium tetrakis(acetylacetonate), titanium bis(acetylacetonate), titanium bis(butoxy)bis(acetylacetonate), titanium bis(isopropoxy)bis(acetylacetonate), zirconium bis(butoxy)bis(acetylacetonate) and zirconium bis(isopropoxy)bis(acetylacetonate). Among them, tin-based catalysts are generally used.

For further improving the chemical resistance of the decorative sheet of the present invention, the content of the catalyst in the surface protective layer 2 is preferably 0.01 parts by mass or more, more preferably 0.2 parts by mass or more based on 100 parts by mass of the ionizing radiation curable resin. On the other hand, when the content of the catalyst in the surface protective layer 2 is excessively high, the moldability of the decorative sheet is deteriorated, and therefore the content of the catalyst in the surface protective layer 2 is preferably 10 parts by mass or less, more preferably 5 parts by mass or less based on 100 parts by mass of the ionizing radiation curable resin.

In addition to the above-mentioned ionizing radiation curable resin, blocked isocyanate and catalyst, various kinds of additives can be blended in the surface protective layer 2 according to desired properties to be imparted to the surface protective layer 2. Examples of the additives include weather resistance improving agents such as ultraviolet absorbers and light stabilizers, abrasion resistance improvers, polymerization inhibitors, crosslinkers, infrared absorbers, antistatic agents, bondability improvers, leveling agents, thixotropy imparting agents, coupling agents, plasticizers, antifoaming agents, fillers, solvents and colorants. The additives can be appropriately selected from those that are commonly used. As the ultraviolet absorber and light stabilizer, a reactive ultraviolet absorber and light stabilizer having a polymerizable group such as a (meth)acryloyl group in the molecule can also be used.

The thickness of the surface protective layer 2 after curing is not particularly limited, but it is preferably 1 to 30 µm, more preferably about 1 to 10 µm. When the thickness of the surface protective layer 2 falls within the above-mentioned range, the decorative sheet has excellent moldability, and sufficient properties as a surface protective layer, such as scratch resistance are obtained. The ionizing radiation curable resin composition for forming the surface protective layer 2 can be uniformly irradiated with an ionizing radiation, and therefore it can be uniformly cured, thus being advantageous in terms of economy.

Formation of the surface protective layer 2 is performed by, for example, preparing an ionizing radiation curable resin composition containing the above-mentioned ionizing radiation curable resin, blocked isocyanate and additives added as necessary, and applying and crosslinking/curing the ionizing radiation curable resin composition. The viscosity of the ionizing radiation curable resin composition may be a viscosity that allows an uncured resin layer to be formed on a layer adjacent to the surface protective layer 2 by an application method as described later. In the present invention, an uncured resin layer is formed by applying a prepared application liquid onto a layer adjacent to the surface protective layer 2 by a known method such as gravure coating, bar coating, roll coating, reverse roll coating or comma coating, preferably gravure coating so that the above-mentioned thickness is obtained. The uncured resin layer formed in this manner is irradiated with an ionizing radiation such as an electron beam or an ultraviolet ray to cure the uncured resin layer, so that the surface protective layer 2 is formed. When an electron beam is used as the ionizing radiation, an accelerating voltage thereof can be appropriately selected according to a resin to be used and a thickness of the layer, but the accelerating voltage is normally about 70 to 300 kV.

In irradiation of an electron beam, the transmission capacity increases as the accelerating voltage becomes higher, and therefore when a resin that is easily degraded by irradiation of an electron beam is used in a layer under the surface protective layer 2, an accelerating voltage is selected so that the transmission depth of the electron beam is substantially equal to the thickness of the surface protective layer 2. Accordingly, a layer situated under the surface protective layer 2 can be inhibited from being excessively irradiated with an electron beam, so that degradation of the layers by an excessive electron beam can be minimized. The amount of irradiation is preferably an amount with which the crosslinking density of the protective layer 2 is saturated, and the amount of irradiation is selected within a range of normally 5 to 300 kGy (0.5 to 30 Mrad), preferably 10 to 50 kGy (1 to 5 Mrad). Further, the electron beam source is not particularly limited, and various kinds of electron beam accelerators can be used such as, for example, those of Cockcroft-Walton type, Van de Graaff type, tuned transformer type, insulated core transformer type, linear type, dynamitron type and high frequency type. When an ultraviolet ray is used as the ionizing radiation, it is practical to radiate light including an ultraviolet ray having a wavelength of 190 to 380 nm. The ultraviolet ray source is not particularly limited, and examples thereof include high-pressure mercury lamps, low-pressure mercury lamps, metal halide lamps, carbon arc lamps and ultraviolet-ray emitting diodes (LED-UV).

[Pattern Layer 3]

The pattern layer 3 is a layer that imparts decorativeness to the resin molded article. The pattern layer 3 is provided between the base material layer 1 and the surface protective layer 2 as necessary. The pattern layer 3 is formed by printing various patterns using ink and a printer. The pattern formed by the pattern layer 3 is not particularly limited, examples thereof include wood-grain patterns, rift patterns resembling a surface of rock, such as marble patterns (e.g., travertine marble patterns), textile patterns resembling texture or fabric patterns, tiling patterns and brick masonry patterns, and also patterns formed by combining these patterns, such as those of wooden mosaics and patchworks. These patterns are formed by multicolor printing with usual process colors of yellow, red, blue and black, and also formed by multicolor printing etc. with spot colors, which is performed using plates of individual colors that constitute patterns.

As pattern ink to be used in the pattern layer 3, one obtained by appropriately mixing a binder with a colorant such as a pigment or a dye, an extender, a solvent, a stabilizer, a plasticizer, a catalyst, a curing agent and so on is used. The binder is not particularly limited, and examples thereof include polyurethane resins, vinyl chloride-vinyl acetate-based copolymer resins, vinyl chloride-vinyl acetate-acrylic copolymer resins, chlorinated polypropylene-based resins, acrylic resins, polyester-based resins, polyamide-based resins, butyral-based resins, polystyrene-based resins, nitrocellulose-based resins and cellulose acetate-based resins. These resins may be used alone, or may be used in combination of two or more thereof.

The colorant is not particularly limited, and examples thereof include inorganic pigments such as carbon black, iron black, titanium white, antimony white, chrome yellow, titanium yellow, iron red, cadmium red, ultramarine blue and cobalt blue, organic pigments or dyes such as quinacridone red, isoindolinone yellow and phthalocyanine blue, metallic pigments composed of scalelike foil pieces of aluminum, brass or the like, and pearlescent (pearl) pigments composed of scalelike foil pieces of titanium dioxide-coated mica, basic lead carbonate or the like.

The thickness of the pattern layer 3 is not particularly limited, but it is, for example, about 1 to 30 μm, preferably about 1 to 20 μm.

[Masking Layer 5]

The masking layer 5 is provided for the purpose of suppressing a change or variation in color of the base material layer 1. The masking layer 5 is provided as necessary between the base material layer 1 and the surface protective layer 2, or between the base material layer 1 and the pattern layer 3 if the pattern layer 3 is provided (not illustrated).

The masking layer 5 is provided for inhibiting the base material layer 1 from adversely affecting the color tone and pattern of the decorative sheet, and is therefore formed as a layer of opaque color in general.

The masking layer 5 is formed using an ink composition obtained by appropriately mixing a binder with a colorant such as a pigment or a dye, an extender, a solvent, a stabilizer, a plasticizer, a catalyst, a curing agent and so on. The ink composition for forming the masking layer 5 is appropriately selected from those to be used in the pattern layer 3.

The masking layer 5 is desirable to be formed as a so-called solid printing layer with its thickness usually set to about 1 to 20 μm.

[Primer Layer 4]

In the decorative sheet of the present invention, the primer layer 4 may be provided as desired for the purpose of, for example, inhibiting occurrence of fine cracks and whitening in the stretched portion of the surface protective layer 2. In this case, the primer layer 4 is provided between the base material layer 1 and the surface protective layer 2, or between the pattern layer 3 and the surface protective layer 2 if the pattern layer 3 is provided. Preferably, the primer layer 4 is provided immediately below the surface protective layer 2. Specifically, when the surface protective layer 2 and the primer layer 4 are provided in contact with each other, the chemical resistance of the resulting decorative resin molded article can be further improved because in the process of forming the decorative resin molded article, the blocked isocyanate contained in the surface protective layer 2 reacts with the following primer composition that forms the primer layer 4, so that the surface protective layer 2 and the primer layer 4 are firmly bonded together.

As the primer composition that forms the primer layer 4, one having a urethane resin, a (meth)acrylic resin, a (meth)acryl-urethane copolymer resin, a vinyl chloride-vinyl acetate copolymer, a polyester resin, a butyral resin, chlorinated polypropylene, chlorinated polyethylene or the like as a binder resin is preferably used. Among these resins, a urethane resin, a (meth)acrylic resin and a (meth)acryl-urethane copolymer resin are preferable.

As the urethane resin, a polyurethane obtained by reacting a polyol (polyhydric alcohol) with an isocyanate can be used. As the polyol, one having two or more hydroxyl groups in the molecule, for example polyester polyol, polyethylene glycol, polypropylene glycol, acryl polyol, polyether polyol or the like is used. As the isocyanate, polyvalent isocyanate having two or more isocyanate groups in the molecule; an aromatic isocyanate such as 4,4-diphenylmethane diisocyanate; or aliphatic (or cycloaliphatic) isocyanates such as hexamethylene diisocyanate, isophorone diisocyanate, hydrogenated tolylene diisocyanate or hydrogenated diphenylmethane diisocyanate is used. A urethane resin and a butyral resin can be mixed to form the primer layer.

Examples of the (meth)acrylic resin include homopolymers of a (meth)acrylic acid ester, copolymers of two or more different (meth)acrylic acid ester monomers, and copolymers of a (meth)acrylic acid ester and another monomer, and specifically, (meth)acrylic resins composed of homopolymers or copolymers including (meth)acrylic acid esters such as polymethyl (meth)acrylate, polyethyl (meth)acrylate, polypropyl (meth)acrylate, polybutyl (meth)acrylate, methyl (meth)acrylate-butyl (meth)acrylate copolymers, ethyl (meth)acrylate-butyl (meth)acrylate copolymers, ethylene-methyl (meth)acrylate copolymers and styrene-methyl (meth)acrylate copolymers are suitably used.

For example, the (meth)acryl-urethane copolymer resin is preferably an acryl-urethane (polyester urethane) block copolymer-based resin. As the curing agent, the various kinds of isocyanates described above are used. The acryl/urethane ratio (mass ratio) in the acryl-urethane (polyester urethane) block copolymer-based resin is adjusted to fall within the range of preferably 9/1 to 1/9, more preferably 8/2 to 2/8.

The primer composition that forms the primer layer 4 is preferably a polyol resin for improving the chemical resistance and moldability of the decorative sheet. The content of the polyol resin in the resin that forms the primer layer 4 is preferably 60% by mass or more, more preferably 80% by mass or more.

Specific examples of the polyol resin include acryl polyols; polyester polyols; polycarbonate diols; urethane polyols such as polyester urethane polyol and acryl urethane polyol; and polyolefin polyols such as polyethylene polyol, polypropylene polyol, polybutadiene polyol and polyisoprene polyol. Among them, acryl polyols, polyester polyols and polycarbonate diols are preferable for improving the chemical resistance and moldability of the decorative sheet, and acryl polyols are especially preferable for further improving the moldability of the decorative sheet.

The acryl polyol is not particularly limited as long as it is an acryl-based resin having a plurality of hydroxyl groups, and examples thereof include copolymers obtained by copolymerizing one or more of (meth)acrylic acid alkyl ester monomers such as methyl (meth)acrylate, ethyl (meth)acrylate, n-propyl (meth)acrylate, isopropyl (meth)acrylate, n-butyl (meth)acrylate, isobutyl (meth)acrylate, octyl (meth)acrylate and ethylhexyl (meth)acrylate, etc., and one or more of (meth)acrylic acid ester monomers having a hydroxyl group in the molecule, such as 2-hydroxyethyl (meth)acrylate, 2-hydroxypropyl (meth)acrylate and 2-hydroxy-3-phenoxypropyl (meth)acrylate, and further a styrene monomer etc. as necessary, the copolymers each having a plurality of hydroxyl groups.

Examples of the polyester polyol include condensed polyester diols obtained by reacting a low-molecular diol and a dicarboxylic acid, polylactone diols obtained by ring-opening polymerization of a lactone, and polycarbonate diols. Examples of the dicarboxylic acid include aliphatic dicarboxylic acids such as succinic acid, adipic acid, sebacic acid, glutaric acid, azelaic acid, maleic acid and fumaric acid, and aromatic dicarboxylic acids such as terephthalic acid and isophthalic acid. As the lactone, for example, ε-caprolactone is used. Specific examples of the polyester polyol include polyethylene adipate, polybutylene adipate, polyhexamethylene adipate, polyneopentyl adipate, polyethylene butylene adipate, polybutylene hexabutylene adipate, polydiethylene adipate, poly(polytetramethylene ether)adipate, polyethylene azate, polyethylene sebacate, polybutylene azate, polybutylene sebacate and polyhexamethylene carbonate diol.

The polycarbonate diol is a polycarbonate having a hydroxyl group at each of both ends in the molecule.

The weight average molecular weight of the resin that forms the primer layer 4 is not particularly limited, but it is preferably 2000 or more, more preferably about 2000 to 100000, further preferably about 2000 to 50000 for further improving the chemical resistance and moldability of the decorative sheet. When the weight average molecular weight of the resin that forms the primer layer 4 is less than 2000, there may be a problem that in formation of the surface protective layer on the primer layer, the primer layer is dissolved to whiten the primer layer. When the weight average molecular weight of the resin that forms the primer layer 4 is more than 100000, the viscosity of the primer composition may be excessively high, leading to occurrence of printing failure. In the present invention, the weight average molecular weight of the resin that forms the primer layer 4 is a value obtained by performing measurement using a gel permeation chromatography method (GPC) using polystyrene as a standard substance.

The glass transition point (Tg) of the polyol resin is not particularly limited, but it is preferably 55° C. or higher, more preferably about 55 to 140° C., further preferably about 65 to 120° C., especially preferably 80 to 100° C. for further improving the chemical resistance and moldability of the decorative sheet. When the glass transition temperature Tg of the polyol resin is lower than 55° C., the primer layer 4 is soft enough to have tackiness, and therefore when the decorative sheet of the present invention is produced in a roll-to-roll process, the primer layer 4 is easily scratched when coming into contact with a guide roll after the primer layer 4 is applied onto, for example, the foregoing pattern layer 3, and blocking may occur at the time of winding the decorative sheet at a sheet discharge section. Under a high-temperature environment, for example in a vehicle in the summertime, the primer layer 4 may come into a semi-molten state, leading to dislocation, for example, between the pattern layer 3 and the surface protective layer 2 particularly at a portion stretched at a high draw ratio in three-dimensional molding. On the other hand, when the glass transition temperature Tg of the polyol resin is 140° C. or lower, the resin in the primer layer 4 is sufficiently softened by heat applied in the process for production of the decorative sheet (drying step after lamination of the primer layer 4 and drying step during lamination of the pattern layer 3), and therefore adhesion, for example, between the surface protective layer 2 and the pattern layer 3 is improved.

The resins to be used for forming the primer layer 4 may be used alone, or may be used in combination of two or more thereof. Specifically, for example, acryl polyol and polyurethane can be used in combination.

In the present invention, a crosslinker (curing agent) may be used along with a polyol resin that forms the primer layer 4. By using a crosslinker, adhesion between the surface protective layer 2 and the primer layer 4 can be improved. The content of the crosslinker is preferably 1 to 10 parts by mass based on 100 parts by mass of the polyol resin that forms the primer layer 4.

On the other hand, when the amount of the crosslinker is set in the range of 1 to 5 parts by mass based on 100 parts by mass of the polyol resin that forms the primer layer 4, the amount of the crosslinker can be reduced to particularly improve the moldability of the decorative sheet. Further, when the amount of the crosslinker is set in the above-mentioned specific range, the surface protective layer 2 is hardly delaminated even if the decorative sheet is exposed to a high temperature, so that excellent heat resistant adhesion can be exhibited. In the present invention, the blocked isocyanate contained in the surface protective layer 2 may interact with the polyol resin in the primer layer 4 at the interface portion between the surface protective layer 2 and the primer layer 4, and therefore even when the ratio of the crosslinker is relatively small as described above, excellent chemical resistance can be exhibited. For particularly improving the moldability of the decorative sheet, it is preferable that the content of the crosslinker be set in the above-mentioned range, and that the content of the blocked isocyanate in the surface protective layer 2 be set in the range of 0.5 to 5 parts by mass based on 100 parts by mass of the resin contained in the surface protective layer 2.

In the present invention, the blocked isocyanate contained in the surface protective layer 2 may interact with the polyol resin in the primer layer 4 at the interface portion between the surface protective layer 2 and the primer layer 4, and therefore even when the primer layer 4 does not contain a crosslinker, excellent chemical resistance can be exhibited while adhesion between the surface protective layer 2 and the primer layer 4 is improved. Further, since the primer layer 2 does not substantially contain a crosslinker, the primer layer 4 is flexible, so that the moldability of the decorative sheet is improved, and therefore when the moldability of the decorative sheet is considered important, it is preferable that the primer layer 4 does not substantially contain a crosslinker.

The crosslinker is not particularly limited as long as it is capable of crosslinking a polyol resin, and examples thereof include isocyanate compounds. As the isocyanate compound, for example, polyvalent isocyanate having two or more isocyanate groups in the molecule; an aromatic isocyanate such as 4,4-diphenylmethane diisocyanate; or aliphatic (or cycloaliphatic) isocyanates such as hexamethylene diisocyanate (HMDI), isophorone diisocyanate, hydrogenated tolylene diisocyanate or hydrogenated diphenylmethane diisocyanate is used.

The primer layer 4 is formed by a normal coating method such as gravure coating, gravure reverse coating, gravure offset coating, spinner coating, roll coating, reverse roll coating, kiss coating, wheeler coating, dip coating, solid coating with a silk screen, wire bar coating, flow coating, comma coating, pour coating, blushing or spray coating, or a transfer coating method using a primer composition. Here, the transfer coating method is a method in which a coating film of the primer layer or the adhesive layer is formed on a thin sheet (film base material), and thereafter the intended surface of the layer in the decorative sheet is coated with the coating film.

The thickness of the primer layer 4 is not particularly limited, but it is preferably 0.1 μm or more. When the thickness is 0.1 μm or more, an effect of preventing cracking, rupture, whitening and the like of the surface protective layer 2 is exhibited. On the other hand, it is preferable that the thickness of the primer layer 4 be 10 μm or less because the coating film is stably dried and cured in application of the primer layer 4, and therefore three-dimensional moldability is not varied.

[Adhesive Layer 6]

The adhesive layer 6 is a layer that is provided on the back surface of the base material layer 1 as necessary for the purpose of, for example, improving bondability and adhesion between the decorative sheet and a molded resin. The resin that forms the adhesive layer 6 is not particularly limited as long as it can improve bondability and adhesion between the decorative sheet and a molded resin, and examples thereof include thermoplastic resins and thermosetting resins. Examples of the thermoplastic resin include acrylic resins, acryl-modified polyolefin resins, chlorinated polyolefin resins, vinyl chloride-vinyl acetate copolymers, thermoplastic urethane resins, thermoplastic polyester resins, polyamide resins and rubber-based resins. The thermoplastic resins may be used alone, or may be used in combination of two or more thereof. Examples of the thermosetting resin include urethane resins and epoxy resins. The thermosetting resins may be used alone, or may be used in combination of two or more thereof.

The adhesive layer 6 is not a layer that is necessarily needed, but it is preferable to provide the adhesive layer 6 when it is conceivable that the decorative sheet of the present invention is applied to a decoration method in which the decorative sheet is bonded onto a previously provided resin molded body, such as a vacuum press-bonding method as described later. When the decorative sheet is used in a vacuum press-bonding method, it is preferable to form the adhesive layer 7 using, among various resins described above, one that is commonly used as a resin which exhibits bondability under pressure or heating.

2. Decorative resin molded article

The decorative resin molded article of the present invention is formed by integrating a molded resin with the decorative sheet of the present invention. Specifically, the decorative resin molded article of the present invention includes at least a molded resin layer and a surface protective layer, the surface protective layer being formed of an ionizing radiation curable resin composition containing a blocked isocyanate. In the decorative resin molded article of the present invention, the decorative sheet may be provided with at least one of the above-mentioned pattern layer 3, primer layer 4, masking layer 5 and so on as necessary.

For example, the decorative resin molded article of the present invention is prepared by various injection molding methods such as an insert molding method, an injection molding simultaneous decorating method, a blow molding method and a gas injection molding method using the decorative sheet of the present invention. In the decorative sheet of the present invention, crosslinking by the blocked isocyanate contained in the surface protective layer may be started in the process of heating and molding the decorative sheet, for example, during injection molding in the above-mentioned molding method, or during preliminary molding (vacuum molding) prior to the injection molding, and the decorative resin molded article of the present invention which is obtained by the molding method can exhibit excellent chemical resistance. Among these injection molding methods, an insert molding method and an injection molding simultaneous decorating method are preferable.

In the insert molding method, first the decorative sheet of the present invention is vacuum-molded into a molded article surface shape beforehand using a vacuum molding die (off-line preliminary molding) in a vacuum molding step, and then an unnecessary portion is trimmed off as necessary to obtain a molded sheet. The molded sheet is inserted into an injection molding die, the injection molding die is closed, a fluidized resin is injected into the die, and solidified to integrate the decorative sheet with the outer surface of the resin molded body in parallel to injection molding, thereby producing a decorative resin molded article.

More specifically, the decorative resin molded article of the present invention is produced by an insert molding method including:

a vacuum molding step of molding the decorative sheet of the present invention into a three-dimensional shape beforehand by a vacuum molding die;

a trimming step of trimming off an unnecessary portion of the vacuum-molded decorative sheet to obtain a molded sheet; and an integration step of inserting the molded sheet into an injection molding die, closing the injection molding die, and injecting a fluidized resin into the injection molding die to integrate the resin with the molded sheet.

In the vacuum molding step in the insert molding method, the decorative sheet may be heated and molded. The heating temperature here is not particularly limited, and may be appropriately selected according to a type of the resin that forms the decorative sheet, or a thickness of the decorative sheet, but for example, when an ABS resin film is used as the base material layer, the heating temperature may be normally about 120 to 200° C. In the integration step, the temperature of the fluidized resin is not particularly limited, and it may be normally about 180 to 320° C.

In the injection molding simultaneous decorating method, the decorative sheet of the present invention is disposed in a female die also serving as a vacuum molding die provided with a suction hole for injection molding, and is subjected to preliminary molding in this female die (in-line preliminary molding), the injection molding die is then closed, a fluidized resin is injected and filled into the die, and solidified to integrate the decorative sheet of the present invention with the outer surface of the resin molded body in parallel to injection molding, thereby producing a decorative resin molded article.

More specifically, the decorative resin molded article of the present invention is produced by an injection molding simultaneous decorating method including:

a preliminary molding step of placing the decorative sheet of the present invention in such a manner that a surface of the base material layer on the decorative sheet faces a molding surface of a movable die, the molding surface having a predetermined shape, then heating and softening the decorative sheet, and vacuum-suctioning the decorative sheet from the movable die side to adhere the softened decorative sheet along the molding surface of the movable die, thereby preliminarily molding the decorative sheet;

an integration step of closing the movable die having the decorative sheet adhered along the molding surface, and a fixed die, then injecting and filling a fluidized resin into a cavity formed by both the dies, solidifying the resin to form a resin molded body, and laminating and integrating the resin molded body and the decorative sheet with each other; and a taking-out step of separating the movable die from the fixed die to take out the resin molded body with all the layers of the decorative sheet laminated thereon.

In the preliminary molding step in the injection molding simultaneous decorating method, the heating temperature of the decorative sheet is not particularly limited, and may be appropriately selected according to a type of the resin that forms the decorative sheet, or a thickness of the decorative sheet, but when a polyester resin film or an acrylic resin film is used as the base material layer, the heating temperature may be normally about 70 to 130° C. In the injection molding step, the temperature of the fluidized resin is not particularly limited, but it may be normally about 180 to 320° C.

The decorative resin molded article of the present invention can also be prepared by a decoration method in which the decorative sheet of the present invention is bonded onto a previously provided three-dimensional resin molded body (molded resin layer), such as a vacuum press-bonding method.

In the vacuum press-bonding method, first the decorative sheet of the present invention and a resin molded body are placed in a vacuum press-bonding machine including a first vacuum chamber situated on the upper side and a second vacuum chamber situated on the lower side in such a manner that the decorative sheet is on the first vacuum chamber side and the resin molded body is on the second vacuum chamber side, and that the base material layer 1 side of the decorative sheet faces the resin molded body side. The two vacuum chambers are then evacuated. The resin molded body is placed on a lift table that is provided on the second vacuum chamber side and is capable of moving up and down. Then, the first vacuum chamber is pressurized, and the molded body is pressed against the decorative sheet with the lift table, and by using a pressure difference between the two vacuum chambers, the decorative sheet is bonded to the surface of the resin molded body while being stretched. Finally, the two vacuum chambers are released to atmospheric pressure, and an unnecessary portion of the decorative sheet is trimmed off, so that the decorative resin molded article of the present invention can be obtained.

Preferably, the vacuum press-bonding method includes a step of heating the decorative sheet for softening the decorative sheet to improve the moldability thereof before the step of pressing the molded body against the decorative sheet. The vacuum press-bonding method including such a step may be referred to particularly as a vacuum heating and press-bonding method. The heating temperature in such a step may be appropriately selected according to a type of the resin that forms the decorative sheet, or a thickness of the decorative sheet, but when a polyester resin film or an acrylic resin film is used as the base material layer, the heating temperature may be normally about 60 to 200° C.

When the decorative sheet of the present invention is subjected to the vacuum heating and press-bonding method, a crosslinking reaction by the blocked isocyanate can be started in the step of heating the decorative sheet. When the reaction by heating in the step is insufficient, or a vacuum press-bonding method which does not include the step is employed, it is preferable that after decoration on the molded body, heating be performed to complete the crosslinking reaction.

In the decorative resin molded article of the present invention, a resin appropriate to an intended use may be selected to form the molded resin layer. The molding resin for forming the molded resin layer may be a thermoplastic resin or may be a thermosetting resin.

Specific examples of the thermoplastic resin include polyolefin-based resins such as polyethylene and polypropylene, ABS resins, styrene resins, polycarbonate (PC) resins, acrylic resins and vinyl chloride-based resins. These thermoplastic resins may be used alone, or may be used in combination of two or more thereof.

Examples of the thermosetting resin include urethane resins and epoxy resins. These thermosetting resins may be used alone, or may be used in combination of two or more thereof.

Owing to excellent chemical resistance, and high moldability of the decorative sheet, the decorative resin molded article of the present invention can be used for, for example, interior materials or exterior materials of vehicles such as automobiles; fittings such as window frames and door frames; interior materials of buildings such as walls, floors and ceilings; housings of household electric appliances such as television receivers and air conditioners; and containers etc.

EXAMPLES

Hereinafter, the present invention will be described in detail by way of examples and comparative examples. However, the present invention is not limited to examples.

Examples 1 to 12 and 19 and Comparative Examples 1 and 2

(Preparation of Decorative Sheet)

A pattern layer (thickness: 5 μm) was formed on an ABS resin film (thickness: 400 μm) as a base material by gravure printing using an ink containing a vinyl chloride-vinyl acetate-acryl-based copolymer resin. Next, a primer layer (thickness: 3 μm) was provided on the pattern layer by gravure printing using a primer composition (89.9 parts by mass of an acryl polyol resin (weight average molecular weight: 8000), 10.1 parts by mass of a polyurethane resin (weight average molecular weight: 6000) and 7 parts by mass of hexamethylene diisocyanate). Next, an electron beam curable resin as described in Table 1 and Table 2 was applied by bar coating in such a manner that the thickness of the resin composition after curing would be 10 μm, so that a surface protective layer composed of an uncured electron beam curable resin was formed. Next, the uncured surface protective layer was irradiated with an electron beam with an accelerating voltage of 165 kV and an irradiation dose of 50 kGy (5 Mrad), so that the electron beam curable resin was cured to obtain a decorative sheet in which a base material layer, a pattern layer, a primer layer and a surface protective layer were laminated in this order. Next, the moldability, chemical resistance and heat resistant adhesion of the obtained decorative sheet were evaluated in the following manner. The results are shown in Table 1 and Table 2. In Example 19, the amount of hexamethylene diisocyanate as a crosslinker (curing agent) for the primer layer was 3 parts by mass.

Examples 13 to 18

Except that hexamethylene diisocyanate was not blended in the primer composition, the same procedure as in Examples 1 to 12 and Comparative Examples 1 and 2 is used to obtain a decorative sheet. The moldability and chemical resistance of the obtained decorative sheet were evaluated in the following manner. The results are shown in Table 1 and Table 2.

(Evaluation of Moldability)

In vacuum molding, the decorative sheet was heated to 180° C., and molded using a mold having a section corresponding to a draw ratio of 100 to 250%, a mold having a section corresponding to a draw ratio of 100 to 300%, and a mold having a section corresponding to 100 to 350%. The surface state of the decorative sheet after molding was visually observed, and moldability was evaluated in accordance with the following criteria.

⊚⊚⊚: The coating film is not cracked in a section with an elongation of 350%, and moldability is especially high.

⊚⊚: The coating film is not cracked in a section with an elongation of 300%, and moldability is extremely high.

⊚: The coating film is not cracked in a section with an elongation of 250%, and moldability is very high.

◯: The coating film is not cracked in a section with an elongation of 200%, and moldability is high.

Δ: The coating film is not cracked in a section with an elongation of 150%, and moldability is practically acceptable.

xx: The coating film is cracked in a section with an elongation of less than 150%, and moldability is practically unacceptable.

(Evaluation of Chemical Resistance)

For a decorative resin molded article obtained by heating the decorative sheet to 180° C., and performing injection molding using an ABC resin as a molded resin, the following tests were conducted. The temperature of the molded resin during injection molding was 240° C.

Sunscreen Cosmetic

A commercially available sunscreen cosmetic was dropped to a surface of the decorative sheet, and the decorative sheet was left standing in an oven at 80° C. for 1 hour with gauze placed over the surface of the decorative sheet. The decorative sheet was taken out, the surface thereof was washed using a cleaning liquid, the state of the dropped portion was then visually observed, and chemical resistance with respect to the sunscreen cosmetic was evaluated in accordance with the following criteria. The sunscreen cosmetic is a commercially available SPF 50 product, and contains 3% of 1-(4-methoxyphenyl)-3-(4-tert-butylphenyl)-1,3-propanedione, 10% of 3,3,5-trimethylcyclohexyl salicylate, 5% of 2-ethylhexyl salicylate and 10% of 2-ethylhexyl 2-cyano-3,3-diphenylacrylate as components.

⊚: A gauze trace does not remain, and chemical resistance is very high.

◯: A gauze trace remains, but is negligible, and chemical resistance is high.

Δ: A gauze trace does not remain over the whole of the dropped surface, and chemical resistance is practically acceptable.

xx: A gauze trace remains over the whole of the dropped surface, and chemical resistance is practically unacceptable.

Insect Repellent

A commercially available insect repellent was dropped to a surface of the decorative sheet, and the decorative sheet was left standing in an oven at 80° C. for 1 hour with gauze placed over the surface of the decorative sheet. The decorative sheet was taken out, the surface thereof was washed using a cleaning liquid, the state of the dropped portion was then visually observed, and chemical resistance with respect to the insect repellent was evaluated in accordance with the following criteria. The Insect repellent is a commercially available product, and contains 25% of DEET (N,N-diethyl-m-toluamide) and 75% of other components.

⊚: A gauze trace does not remain, and chemical resistance is very high.

◯: A gauze trace remains, but is negligible, and chemical resistance is high.

Δ: A gauze trace does not remain over the whole of the dropped surface, and chemical resistance is practically acceptable.

xx: A gauze trace remains over the whole of the dropped surface, and chemical resistance is practically unacceptable.

Ethanol

A surface of the decorative sheet was rubbed using gauze containing ethanol (purity: 99.5%) while a load of 500 g was applied to the decorative sheet.

⊚: The surface protective layer is not delaminated even with 100 or more rubbings, and chemical resistance is very high.

◯: The surface protective layer is not delaminated with 50 or more rubbings, and chemical resistance is high.

Δ: The surface protective layer is not delaminated with 30 or more rubbings, and chemical resistance is practically acceptable.

xx: The surface protective layer is delaminated with less than 30 rubbings, and chemical resistance is practically unacceptable.

(Evaluation of Heat Resistant Adhesion)

The decorative sheets obtained in Examples 4, 11, 17 and 19 and Comparative Examples 1 and 2 were each heated to 180° C., and vacuum-molded using a mold having a section corresponding to a draw ratio of 100 to 300%. Next, a decorative resin molded article was obtained by injection molding using an ABS resin as a molded resin. The temperature of the molded resin during injection molding was 240° C. The obtained decorative resin molded article was left standing under an environment at 110° C. and a relative humidity of 15% for 1 week, and evaluated for delamination of the surface protective layer. The evaluation criteria are as follows. The results are shown in Table 2.

⊚: The surface protective layer is not delaminated at all, and heat resistant adhesion is very satisfactory.

◯: The surface protective layer is slightly delaminated, but the delamination is negligible, and heat resistant adhesion is satisfactory.

Δ: The surface protective layer is slightly delaminated, but heat resistant adhesion is practically acceptable.

xx: The surface protective layer is delaminated, and heat resistant adhesion is practically unacceptable.

TABLE 1

|  | Example 1 | Example 2 | Example 3 | Example 4 | Example 5 | Example 6 | Example 7 |
|---|---|---|---|---|---|---|---|
| Ionizing radiation curable resin (the unit of the parenthesized number is parts by mass) | | | | EB1 (100) | | | |
| Blocked isocyanate | | A | | | | B | |
| Amount of blocked isocyanate (parts by mass) | 4 | 5 | 4 | | | 5 | |
| Amount of catalyst (parts by mass) | | 0.25 | | 0 | 0.25 | 0.5 | 1.5 |
| Amount of crosslinker in primer layer (parts by mass) | | | | 7 | | | |
| Moldability | ⊚ | ⊚ | ⊚ | ⊚⊚ | ⊚ | ○ | △ |
| Chemical resistance — Sunscreen cosmetic | △ | ○ | △ | △ | ○ | ⊚ | ⊚ |
| Chemical resistance — Insect repellent | △ | △ | △ | △ | △ | ○ | ○ |
| Chemical resistance — Ethanol | △ | ○ | △ | △ | ○ | ○ | ⊚ |

|  | Example 8 | Example 9 | Example 10 | Example 11 | Example 12 | Comparative Example 1 | Comparative Example 2 |
|---|---|---|---|---|---|---|---|
| Ionizing radiation curable resin (the unit of the parenthesized number is parts by mass) | | EB1 (100) | | | EB2 (100) | EB1 (100) | EB2 (100) |
| Blocked isocyanate | | | B | | | — | — |
| Amount of blocked isocyanate (parts by mass) | | | 10 | | | — | — |
| Amount of catalyst (parts by mass) | 0 | 0.5 | 1 | 1.5 | 0.5 | — | — |
| Amount of crosslinker in primer layer (parts by mass) | | | | 7 | | | |
| Moldability | ⊚⊚ | ○ | △ | △ | ⊚ | ⊚⊚ | ⊚⊚⊚ |
| Chemical resistance — Sunscreen cosmetic | △ | ⊚ | ⊚ | ⊚ | ⊚ | XX | XX |
| Chemical resistance — Insect repellent | △ | ○ | ○ | ⊚ | ○ | XX | XX |
| Chemical resistance — Ethanol | △ | ○ | ⊚ | ⊚ | ⊚ | XX | XX |

|  | Example 13 | Example 14 | Example 15 | Example 16 | Example 17 | Example 18 | Example 19 |
|---|---|---|---|---|---|---|---|
| Ionizing radiation curable resin (the unit of the parenthesized number is parts by mass) | | EB1 (100) | | | | EB2 (100) | EB1 (100) |
| Blocked isocyanate | | | | B | | | |
| Amount of blocked isocyanate (parts by mass) | | 5 | | | 10 | | 1 |
| Amount of catalyst (parts by mass) | 0.5 | 1.5 | 0.5 | 1 | 1.5 | 0.5 | 2 |
| Amount of crosslinker in primer layer (parts by mass) | | | | 0 | | | 3 |
| Moldability | ⊚⊚ | ○ | ⊚ | ○ | ○ | ⊚⊚ | ⊚⊚⊚ |
| Chemical resistance — Sunscreen cosmetic | ⊚ | ⊚ | ⊚ | ⊚ | ⊚ | ⊚ | ○ |
| Chemical resistance — Insect repellent | ○ | ○ | ○ | ○ | ⊚ | ○ | △ |
| Chemical resistance — Ethanol | ○ | ⊚ | ○ | ⊚ | ⊚ | ⊚ | ○ |

45

TABLE 2

|  | Example 4 | Example 11 | Example 17 | Example 19 | Comparative Example 1 | Comparative Example 2 |
|---|---|---|---|---|---|---|
| Ionizing radiation curable resin (the unit of the parenthesized number is parts by mass) | | | EB1 (100) | | | EB2 (100) |
| Blocked isocyanate | | B | | | — | |
| Amount of blocked isocyanate (parts by mass) | 5 | 10 | 10 | 1 | — | — |
| Amount of catalyst (parts by mass) | 0 | 1.5 | 1.5 | 2 | — | — |
| Amount of crosslinker in primer layer (parts by mass) | 7 | 7 | 0 | 3 | 7 | 7 |
| Heat resistant adhesion | △ | ⊚ | △ | ⊚ | XX | XX |

In Table 1 and Table 2, the ionizing radiation curable resins and blocked isocyanates are as follows. Dibutyltin dilaurate was used as a catalyst.

Ionizing Radiation Curable Resin (EB1)
difunctional polycarbonate acrylate (weight average molecular weight: 10000) (64.7 parts by mass)
difunctional polycarbonate acrylate (weight average molecular weight: 20000) (32.3 parts by mass)
tetrafunctional silicone-modified urethane acrylate (weight average molecular weight: 6000) (3 parts by mass)

(EB2)
difunctional polycarbonate acrylate (weight average molecular weight: 8000) (48.5 parts by mass)
difunctional polycarbonate acrylate (weight average molecular weight: 20000) (48.5 parts by mass)
tetrafunctional silicone-modified urethane acrylate (weight average molecular weight: 6000) (3 parts by mass)

Blocked Isocyanate

A: Blocked hexamethylene diisocyanate (reaction start temperature: 90° C.)
B: Blocked hexamethylene diisocyanate (reaction start temperature: 110° C.)

As shown in Table 1, the decorative sheets of Examples 1 to 19 in which a blocked isocyanate was blended in an ionizing radiation curable resin composition had excellent or practically acceptable chemical resistance and moldability. Comparison of Examples 6, 7 and 9 to 12 with Examples 13 to 18 shows that the decorative sheets of Examples 13 to 18 in which hexamethylene diisocyanate was not blended are improved in moldability. Further, the decorative sheets of Examples 13 to 18 where hexamethylene diisocyanate was not blended had high adhesion after molding. On the other hand, the decorative sheets of Comparative Examples 1 and 2 in which a blocked isocyanate was not blended were excellent in moldability, but had low chemical resistance, and were not practically usable. The decorative sheet of Example 19 in which the amount of the blocked isocyanate in the surface protective layer was set to 1 part by mass, and the amount of the crosslinker in the primer layer was set to 3 parts by mass had particularly high moldability with no cracks in the coating film at a portion with an elongation of 350% even under extremely severe conditions using a mold having a section corresponding to a maximum draw ratio of 350%. Further, as shown in Table 2, the decorative sheets of Example 11 and Example 19 were excellent particularly in heat resistant adhesion.

Reference Examples 1 to 5, Examples 20 to 22 and Comparative Examples 3 to 7

Preparation of Decorative Sheet

A pattern layer (thickness: 5 μm) with a wood-grain pattern was formed on an ABS resin film (thickness: 400 μm) as a base material by gravure printing using an ink having an acrylic resin as a binder. Next, a primer layer (thickness: 2 μm) was provided on the whole surface of the pattern layer by gravure printing using a primer composition having a composition as described in Table 3 and Table 4. Next, a resin (electron beam curable resin, thermosetting resin or thermoplastic resin) as described in Table 3 and Table 4 was applied by bar coating in such a manner that the thickness of the resin composition after curing would be 10 μm. Next, the resin composition was cured to form a surface protective layer. In the case where an electron beam curable resin was used, the uncured surface protective layer was then irradiated with an electron beam with an accelerating voltage of 165 kV and an irradiation dose of 50 kGy (5 Mrad) to cure the electron beam curable resin. In the case where a thermosetting resin was used, the resin was aged at 40° C. until curing was completed. In the case where a thermoplastic resin was used, nothing was done after application. In this way, a decorative sheet was obtained in which a base material layer, a pattern layer, a primer layer and a surface protective layer were laminated in this order. Next, the moldability, adhesion, chemical resistance and heat resistant adhesion of the obtained decorative sheet were evaluated in the following manner. The results are shown in Table 3 and Table 4.

(Evaluation of Moldability)

In vacuum molding, the decorative sheet was heated to 180° C., and molded using a mold having a section corresponding to a draw ratio of 100 to 250%, a mold having a section corresponding to a draw ratio of 100 to 300%, and a mold having a section corresponding to a draw ratio of 100 to 350%. The surface state of the decorative sheet after molding was visually observed, and moldability was evaluated in accordance with the following criteria.

⊚⊚⊚: The coating film is not cracked in a section with an elongation of 350%, and moldability is especially high.

⊚⊚: The coating film is not cracked in a section with an elongation of 300%, and moldability is extremely high.

⊚: The coating film is not cracked in a section with an elongation of 250%, and moldability is very high.

○: The coating film is not cracked in a section with an elongation of 200%, and moldability is high.

Δ: The coating film is not cracked in a section with an elongation of 150%, and moldability is practically acceptable.

xx: The coating film is cracked in a section with an elongation of less than 150%, and moldability is practically unacceptable.

(Evaluation of Adhesion)

The surface of each decorative sheet evaluated for moldability as described above was notched so as to draw 11 lines in a longitudinal direction and 11 lines in a lateral direction at intervals of 2 mm over a length of 5 mm using a cutter, so that a notch was formed in the shape of a checkerboard having 100 squares in total with 10 squares in a longitudinal direction and 10 squares in a lateral direction. Cellotape (registered trademark) (No. 405-1P) manufactured by Nichiban Co., Ltd. was press-bonded onto the notch, and then rapidly peeled off to evaluate the adhesion of the surface protective layer. The evaluation criteria are as follows.

⊚: Not delaminated at all.
○: Delamination is not recognized by visual inspection.
x: Delaminated.

(Evaluation of Chemical Resistance)

Ethanol Aqueous Solution

Three sheets of gauze (having a length of 20 mm×a width of 20 mm×a thickness of about 1 mm) were stacked and placed over a surface of each decorative sheet evaluated for moldability as described above, an ethanol aqueous solution (ethanol purity: 99.5%) was dropped (dropping amount: 3 to 5 ml) until the whole surface of gauze was soaked in the solution, and a watch glass was put thereon. This was left standing at room temperature (25° C.) for 1 hour, the watch glass and the gauze were removed, and the state of a portion (test surface) of the decorative sheet, on which the gauze had been placed, was visually observed. The evaluation criteria are as follows.

⊚: Defects such as cracking or whitening, swelling, glossiness reduction and detachment of the coating film are not observed on the test surface, and the external appearance is satisfactory.

◯: Slight cracking or whitening, swelling, glossiness reduction, detachment and so on of the coating film are observed on a part of the test surface, but the external appearance is practically acceptable.

Δ: Slight cracking or whitening, swelling, glossiness reduction, detachment and so on of the coating film are observed on the whole of the test surface, and the external appearance is poor and practically unacceptable.

x: Defects such as cracking or whitening, swelling, glossiness reduction, detachment and so on of the coating film are observed on the whole of the test surface, and the external appearance is poor and practically unacceptable.

Sunscreen Cosmetic 0.5 g of a commercially available sunscreen cosmetic was uniformly applied to a 50 mm (length)×50 mm (width) part of the surface of each decorative sheet evaluated for moldability as described above. This decorative sheet was left standing in an oven at 80° C. for 1 hour. The decorative sheet was taken out, the surface thereof was washed using a cleaning liquid, the state of the part coated with the sunscreen cosmetic (test surface) was then visually observed, and chemical resistance with respect to the sunscreen cosmetic was evaluated in accordance with the following criteria. The sunscreen cosmetic is a commercially available SPF 50 product, and contains 3% of 1-(4-methoxyphenyl)-3-(4-tert-butylphenyl)-1,3-propanedione, 10% of 3,3,5-trimethylcyclohexyl salicylate, 5% of 2-ethylhexyl salicylate and 10% of 2-ethylhexyl 2-cyano-3,3-diphenylacrylate as components.

⊚: Defects such as cracking or whitening, swelling, glossiness reduction and detachment of the coating film are not observed on the test surface, and the external appearance is satisfactory.

◯: Slight cracking or whitening, swelling, glossiness reduction, detachment and so on of the coating film are observed on a part of the test surface, but the external appearance is practically acceptable.

Δ: Slight cracking or whitening, swelling, glossiness reduction, detachment and so on of the coating film are observed on the whole of the test surface, and the external appearance is poor and practically unacceptable.

x: Defects such as cracking or whitening, swelling, glossiness reduction, detachment and so on of the coating film are observed on the whole of the test surface, and the external appearance is poor and practically unacceptable.

(Evaluation of Heat Resistant Adhesion)

The decorative sheets obtained in Examples 20 to 22 and Comparative Example 5 were each heated to 180° C., and vacuum-molded using a mold having a section corresponding to a draw ratio of 100 to 300%. Next, a decorative resin molded article was obtained by injection molding using an ABS resin as a molded resin. The temperature of the molded resin during injection molding was 240° C. The obtained decorative resin molded article was left standing under an environment at 110° C. and a relative humidity of 15% for 1 week, and evaluated for delamination of the surface protective layer. The evaluation criteria are as follows. The results are shown in Table 4.

⊚: The surface protective layer is not delaminated at all, and heat resistant adhesion is very satisfactory.

◯: The surface protective layer is slightly delaminated, but the delamination is negligible, and heat resistant adhesion is satisfactory.

Δ: The surface protective layer is slightly delaminated, but heat resistant adhesion is practically acceptable.

xx: The surface protective layer is delaminated, and heat resistant adhesion is practically unacceptable.

TABLE 3

| | | Reference Example 1 | Reference Example 2 | Reference Example 3 | Reference Example 4 | Comparative Example 3 | Comparative Example 4 |
|---|---|---|---|---|---|---|---|
| Surface protective layer | Resin | A | A | A | A | A | A |
| | Curing agent | a | a | a | a | b | b |
| | Resin/Curing agent (mass ratio) | 100/5 | 100/5 | 100/5 | 100/5 | 100/5 | 100/5 |
| | Resin/catalyst (mass ratio) | 100/0.5 | 100/0.5 | 100/0.5 | 100/0.5 | — | — |
| Primer layer | Resin | Acryl polyol | Polyester polyol | Polycarbonate diol | Acryl polyol | Acryl polyol | — |
| | Weight average molecular weight of resin | 6,500 | 2,300 | 3,000 | 10,000 | 6,500 | — |
| | Glass transition point (Tg) of resin | 90° C. | 67° C. | 87° C. | 87° C. | 90° C. | — |
| | Curing agent | HMDI | HMDI | HMDI | — | HMDI | — |
| | Resin/Curing agent (mass ratio) | 100/7 | 100/7 | 100/7 | — | 100/7 | — |
| | Moldability | ◯ | ◯ | ◯ | ⊚⊚ | XX | XX |
| | Adhesion | ◯ | ◯ | ◯ | ◯ | ◯ | ◯ |
| Chemical resistance | Ethanol aqueous solution | ⊚ | ⊚ | ⊚ | ◯ | ◯ | X |
| | Sunscreen cream | ◯ | ◯ | ⊚ | ◯ | ◯ | Δ |

| | | Example 20 | Reference Example 5 | Example 21 | Example 22 | Comparative Example 5 | Comparative Example 6 | Comparative Example 7 |
|---|---|---|---|---|---|---|---|---|
| Surface protective layer | Resin | B | C | B | B | — | — | — |
| | Curing agent | a | a | a | a | — | — | — |
| | Resin/Curing agent (mass ratio) | 100/5 | 100/5 | 100/5 | 100/1 | — | — | — |
| | Resin/catalyst (mass ratio) | 100/0.5 | 100/0.5 | 100/0.5 | 100/2 | — | — | — |

TABLE 3-continued

| | | | | | | | | |
|---|---|---|---|---|---|---|---|---|
| Primer layer | Resin | Acryl polyol | Acryl polyol | Acryl polyol | Acryl polyol | Acryl polyol | Acryl polyol | Acryl polyol |
| | Weight average molecular weight of resin | 6,500 | 6,500 | 10,000 | 10,000 | 6,500 | 3,500 | 10,000 |
| | Glass transition point (Tg) of resin | 90° C. | 90° C. | 87° C. | 87° C. | 90° C. | 60° C. | 87° C. |
| | Curing agent | HMDI | HMDI | — | HMDI | HMDI | HMDI | — |
| | Resin/Curing agent (mass ratio) | 100/7 | 100/7 | — | 100/3 | 100/7 | 100/7 | — |
| | Moldability | ○ | ◎ | ◎◎ | ◎◎◎ | ○ | ○ | ○ |
| | Adhesion | ◎ | ◎ | ○ | ◎ | ○ | ○ | X |
| Chemical resistance | Ethanol aqueous solution | ◎ | ○ | ○ | ◎ | Δ | X | X |
| | Sunscreen cream | ◎ | ○ | ○ | ○ | X | X | X |

TABLE 4

| | | Example 20 | Example 21 | Example 22 | Comparative Example 5 |
|---|---|---|---|---|---|
| Surface protective layer | Resin | B | B | B | B |
| | Curing agent | a | a | a | — |
| | Resin/Curing agent (mass ratio) | 100/5 | 100/5 | 100/1 | — |
| | Resin/catalyst (mass ratio) | 100/0.5 | 100/0.5 | 100/2 | — |
| Primer layer | Resin | Acryl polyol | Acryl polyol | Acryl polyol | Acryl polyol |
| | Weight average molecular weight of resin | 6,500 | 10,000 | 10,000 | 6,500 |
| | Glass transition point (Tg) of resin | 90° C. | 87° C. | 87° C. | 90° C. |
| | Curing agent | HMDI | — | HMDI | HMDI |
| | Resin/Curing agent (mass ratio) | 100/7 | — | 100/3 | 100/7 |
| | Moldability | ○ | ⊙⊙ | ⊙⊙⊙ | ○ |
| | Adhesion | ⊙ | ○ | ⊙ | ○ |
| Chemical resistance | Ethanol aqueous solution | ⊙ | ○ | ⊙ | Δ |
| | Sunscreen cream | ⊙ | ○ | ⊙ | X |
| | Heat resistant adhesion | ○ | Δ | ⊙ | XX |

In Table 3 and Table 4, the resins and curing agents used in the surface protective layer are as follows. Dibutyltin dilaurate was used as a catalyst.

Resin

A: Thermosetting resin

Acryl polyol (hydroxyl value: 55, weight average molecular weight: 8000)

B: Electron beam curable resin difunctional polycarbonate acrylate (weight average molecular weight: 10000)(65 parts by mass)

difunctional polycarbonate acrylate (weight average molecular weight: 20000) (32 parts by mass)

tetrafunctional silicone-modified urethane acrylate (weight average molecular weight: 6000) (3 parts by mass)

C: Thermoplastic resin

Acrylic resin (PMMA, weight average molecular weight: 10000)

Curing Agent a: Blocked hexamethylene diisocyanate trimer (reaction start temperature: 110° C.)

b: Hexamethylene diisocyanate (HMDI)

As shown in Table 3, the decorative sheets of Examples 20 to 22 and Reference Examples 1 to 5 in which a blocked isocyanate was blended in the surface protective layer, and a primer layer was provided had excellent or practically acceptable moldability, adhesion and chemical resistance. The decorative sheets of Reference Example 4 and Example 21 in which a curing agent was not blended in the primer layer had particularly high moldability. Further, comparison between Example 21 and Comparative Example 7 shows that the decorative sheet of Example 21 in which a blocked isocyanate was blended in the surface protective layer had high adhesion although a curing agent was not blended in the primer layer. On the other hand, the decorative sheet of Comparative Example 3 in which an isocyanate that was not blocked was used in the surface protective layer was poor in moldability, and was not practically usable. The decorative sheet of Comparative Example 4, in which an isocyanate that was not blocked was used in the surface protective layer, and a primer layer was not provided, was poor in moldability and chemical resistance. Further, the decorative sheets of Comparative Examples 5 to 7 in which a curing agent was not blended in the surface protective layer were poor in chemical resistance, and were not practically usable. The decorative sheet of Example 22 in which the mass ratio of resin/curing agent in the surface protective layer was 100/1, and the mass ratio of resin/curing agent in the primer layer was 100/3 had particularly high moldability with no cracks in the coating film at a portion with an elongation of 350% even under extremely severe conditions using a mold having a section corresponding to a maximum draw ratio of 350%. Further, as shown in Table 4, the decorative sheet of Example 22 was excellent particularly in heat resistant adhesion.

DESCRIPTION OF REFERENCE SIGNS

1: Base material layer
2: Surface protective layer

3: Pattern layer
4: Primer layer

The invention claimed is:

1. A decorative sheet comprising at least a base material layer, and a surface protective layer formed of a crosslinked ionizing radiation curable resin composition,
the surface protective layer containing a blocked isocyanate,
wherein the blocked isocyanate is in an unreacted state,
wherein the decorative sheet further comprises a primer layer between the base material layer and the surface protective layer,
wherein the primer layer is provided immediately below the surface protective layer,
wherein the primer layer is formed of a resin composition containing a polyol resin and a crosslinker, and wherein the amount of the crosslinker is 1 to 5 parts by mass based on 100 parts by mass of the polyol resin,
and wherein the content of the blocked isocyanate in the surface protective layer is of 0.5 to 5 parts by mass based on 100 parts by mass of the resin contained in the surface protective layer.

2. The decorative sheet according to claim 1, wherein the surface protective layer further contains a catalyst that accelerates dissociation reaction of the blocked isocyanate.

3. The decorative sheet according to claim 1, wherein the ionizing radiation curable resin composition contains a polycarbonate (meth)acrylate.

4. The decorative sheet according to claim 3, wherein the weight average molecular weight of the polycarbonate (meth)acrylate is 5000 or more.

5. The decorative sheet according to claim 3, wherein the ionizing radiation curable resin composition in the surface protective layer further contains a urethane (meth)acrylate.

6. The decorative sheet according to claim 5, wherein a mass ratio of the polycarbonate (meth)acrylate and the urethane (meth)acrylate is in a range of 50:50 to 99:1.

7. The decorative sheet according to claim 1, wherein the thickness of the surface protective layer is 1 to 30 μm.

8. The decorative sheet according to claim 1, wherein the primer layer is formed of a resin composition containing a polyol resin.

9. The decorative sheet according to claim 8, wherein the polyol resin is at least one selected from the group consisting of an acryl polyol, a polyester polyol and a polycarbonate diol.

10. The decorative sheet according to claim 8, wherein the polyol resin has a glass transition point (Tg) of 55° C. or higher and a weight average molecular weight of 2000 or more.

11. The decorative sheet according to claim 1, further comprising a pattern layer between the base material layer and the surface protective layer.

12. The decorative sheet according to claim 1, further comprising a pattern layer between the base material layer and the primer layer.

13. The decorative sheet according to claim 2, wherein the ionizing radiation curable resin composition contains a polycarbonate (meth)acrylate.

14. The decorative sheet according to claim 4, wherein the ionizing radiation curable resin composition in the surface protective layer further contains a urethane (meth)acrylate.

15. A method for producing a decorative resin molded article, the method comprising an integration step of inserting the decorative sheet according to claim 1 into an injection molding die, closing the injection molding die, and injecting a fluidized resin into the injection molding die to integrate the resin with the decorative sheet.

16. The method for producing a decorative resin molded article according to claim 15, comprising, before the integration step, a vacuum molding step of molding the decorative sheet into a three-dimensional shape beforehand using a vacuum molding die.

17. The method for producing a decorative resin molded article according to claim 16, comprising a step of heating the decorative sheet in the vacuum molding step.

* * * * *